United States Patent
Araki et al.

(10) Patent No.: US 10,055,165 B2
(45) Date of Patent: *Aug. 21, 2018

(54) AUTOMATED MIGRATION OF FILE RECALLED BY SPECIFIC APPLICATION

(71) Applicant: International Business Machines Corporation, Armonk, NY (US)

(72) Inventors: Hiroshi Araki, Yokohama (JP); Hiroyuki Miyoshi, Kawasaki (JP); Satoshi Takai, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/796,215

(22) Filed: Oct. 27, 2017

(65) Prior Publication Data

US 2018/0046407 A1 Feb. 15, 2018

Related U.S. Application Data

(63) Continuation of application No. 14/831,890, filed on Aug. 21, 2015.

(30) Foreign Application Priority Data

Sep. 30, 2014 (JP) ................................ 2014-199974

(51) Int. Cl.
*G06F 3/06* (2006.01)
(52) U.S. Cl.
CPC .......... *G06F 3/0647* (2013.01); *G06F 3/0604* (2013.01); *G06F 3/065* (2013.01); *G06F 3/0643* (2013.01); *G06F 3/0689* (2013.01)

(58) Field of Classification Search
CPC .... G06F 3/0647; G06F 3/0604; G06F 3/0643; G06F 3/065; G06F 3/0689
See application file for complete search history.

(56) References Cited

U.S. PATENT DOCUMENTS 8,170,990 B2   5/2012   Shitomi
8,983,910 B1   3/2015   Panchauli et al.
(Continued)

FOREIGN PATENT DOCUMENTS

JP   05081090 A   4/1993
JP   06044107 A   2/1994
(Continued)

OTHER PUBLICATIONS

Araki et al, "Automated Migration of File Recalled by Specific Application", Japan Patent Application No. 2014-199974 (English Translation), filed on Sep. 30, 2014, pp. 1-39.

(Continued)

*Primary Examiner* — Eric Cardwell
(74) *Attorney, Agent, or Firm* — Peter J. Edwards

(57) ABSTRACT

In a hierarchical storage memory (HSM), a file recalled by a specific application is migrated as soon as possible after completion of the application process. Specifically, the effective UID of a specific process is preregistered on an HSM client. After a recall operation is performed on a certain file from the user ID, when there is no access from the UID to the file for a given length of time, the file is migrated. This prevents files premigrated by access from any application other than the specific one from being handled in the same way, resolving a disadvantageous problem caused when these (premigrated) files are not desired to be migrated preferentially.

4 Claims, 6 Drawing Sheets

(56) References Cited

U.S. PATENT DOCUMENTS

| | | |
|---|---|---|
| 9,110,909 B2 | 8/2015 | Sutoh et al. |
| 2011/0035409 A1 | 2/2011 | Shimada et al. |
| 2016/0092141 A1 | 3/2016 | Araki et al. |
| 2016/0259558 A1 | 9/2016 | Kiuchi et al. |

FOREIGN PATENT DOCUMENTS

| | | | |
|---|---|---|---|
| JP | 2003296151 | A | 10/2003 |
| JP | 2006099763 | A | 4/2006 |
| JP | 2006252247 | A | 9/2006 |
| JP | 2008112291 | A | 5/2008 |
| JP | 2010257020 | A | 11/2010 |
| JP | 2010257094 | A | 11/2010 |
| JP | 2011186794 | A | 9/2011 |
| JP | 2012098965 | A | 5/2012 |
| JP | 2014038463 | A | 2/2014 |
| JP | 2014515840 | A | 7/2014 |

OTHER PUBLICATIONS

Araki et al., "Automated Migration of File Recalled by Specific Application", U.S. Appl. No. 15/713,735, filed Sep. 25, 2017.

IBM, List of IBM Patents or Patent Applications Treated as Related, Oct. 26, 2017, 2 pages.

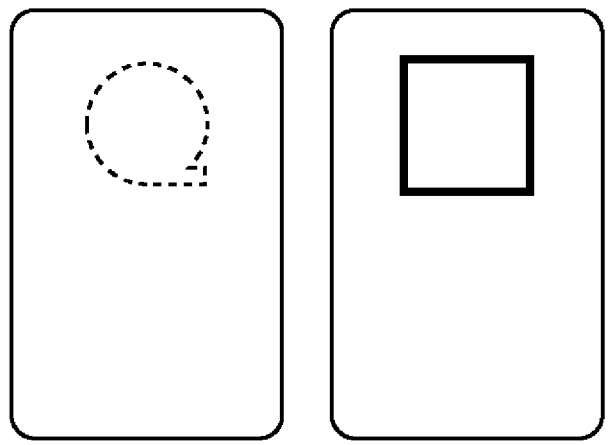
(A) resident
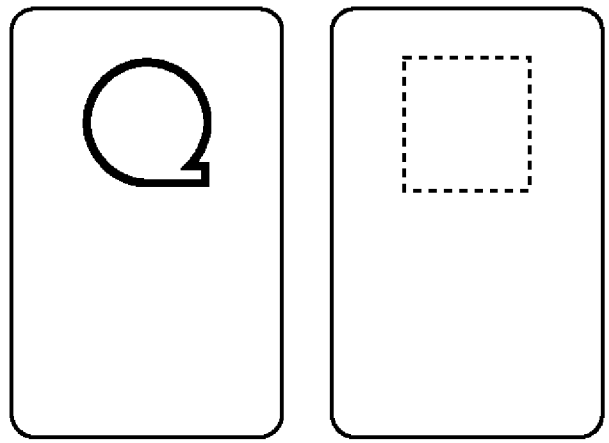
(B) migrated
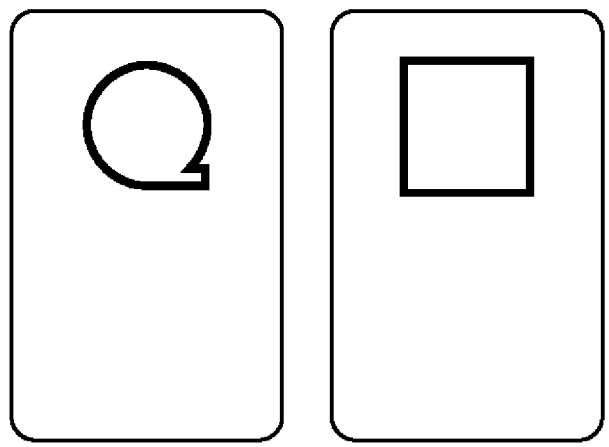
(C) pre-migrated
IMPLEMENTATION OF SERVER-CLIENT MODEL IN HSM
FIG. 2

IMPLEMENTATION OF SERVER-CLIENT MODEL IN HSM

APPLICATIONS IN HSM

The following timeout table is used below as an example.
Here, the effective UID of an asynchronous application is set to 10,
and the UID of another application using the
present invention is set to 20.

| UID | Timeout (sec) |
|-----|---------------|
| 10  | 900           |
| 20  | 1500          |

FIG. 5

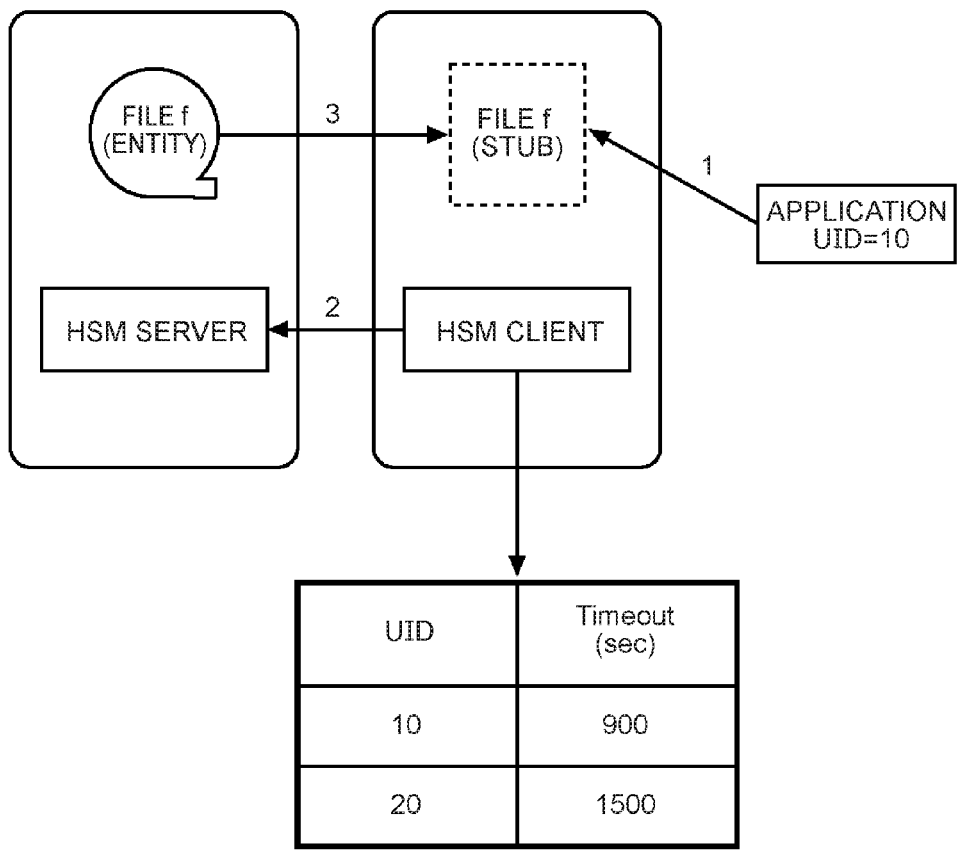

1. The asynchronous copy (UID=10) tries to read file f on a storage.
2. Since f is migrated, the HSM client requests a recall of f from the HSM server.
3. Entity data of file f on a tape or the like are saved into file f on the storage (or spread over a memory).

Here, when the effective UID of a process accessing file f is present in the timeout table, processing shown in FIG. 7 is performed on the HSM client before requesting the recall from the HSM server.

AUTOMATED MIGRATION OF FILE RECALLED BY SPECIFIC APPLICATION

BACKGROUND OF THE INVENTION

The present invention relates to migration in a hierarchical storage.

In a storage system, an architecture called hierarchical storage (hereinafter, HS) dynamically selects a storage device to use and selectively uses the storage device depending on the access frequency of data, and the like, in order to increase the cost-effectiveness of storage. Such systems have been widely used in recent years.

SUMMARY

A method of moving data between primary storage and secondary storage according to an access frequency of data, or a policy, includes receiving access to a file (F) from an application, the file (F) being stored in primary storage or secondary storage, determining whether the access corresponds to an asynchronous copy operation, setting a timeout (T) responsive to determining that the access corresponds to an asynchronous copy operation; recalling the file (F) from secondary storage to primary storage, and migrating the file (F) from primary storage to secondary storage after the set timeout (T) has passed.

A method of moving data between primary storage and secondary storage according to an access frequency of data, or a policy, includes monitoring access to a file (F) from an application, the file (F) being stored in primary storage or secondary storage, determining whether the access is from a specific application, and responsive to determining that the access is from a specific application, recalling the file (F) from secondary storage to primary storage, and after a set, predetermined time has passed, migrating the file (F) from primary storage to secondary storage to handle the access in a manner different from access from any application other than the specific application.

A program connected to a primary storage or running on primary storage to move data between primary storage and a secondary storage in a hierarchical storage (HSM) selectively using either primary storage or secondary storage according to an access frequency of data, or a policy, the program causing a computer to execute the steps of: receiving access to a file (F) from an application, the file (F) being stored in primary storage or secondary storage, determining whether the access corresponds to an asynchronous copy operation, setting a timeout (T) responsive to determining that the access corresponds to an asynchronous copy operation, recalling the file (F) from secondary storage to primary storage, and migrating the file (F) from primary storage to secondary storage after the set timeout (T) has passed.

A program connected to primary storage or running on primary storage to move data between primary storage and secondary storage in a hierarchical storage (HSM) selectively using either primary storage or secondary storage according to an access frequency of data, or a policy, the program causing a computer to execute the steps of: monitoring access to a file (F) from an application, the file (F) being stored in primary storage or secondary storage, determining whether the access is access from a specific application, and responsive to determining that the access is from a specific application, recalling the file (F) from secondary storage to primary storage, and after a set, predetermined time has passed, migrating the file (F) from primary storage to secondary storage to handle the access in a manner different from access from any application other than the specific application.

BRIEF DESCRIPTION OF THE DRAWINGS

FIG. 2 is a schematic diagram showing the states of files in the HSM;

FIG. 5 is a diagram showing a registration example when the present invention is applied to two or more applications;

FIG. 6 is a diagram showing an example of operation in which a certain application accesses file F.

DETAILED DESCRIPTION

It is an object of the present invention to provide a method of migrating a file recalled by an asynchronous copy transparently from a user perspective as soon as possible after completion of the copy.

Figure 1:
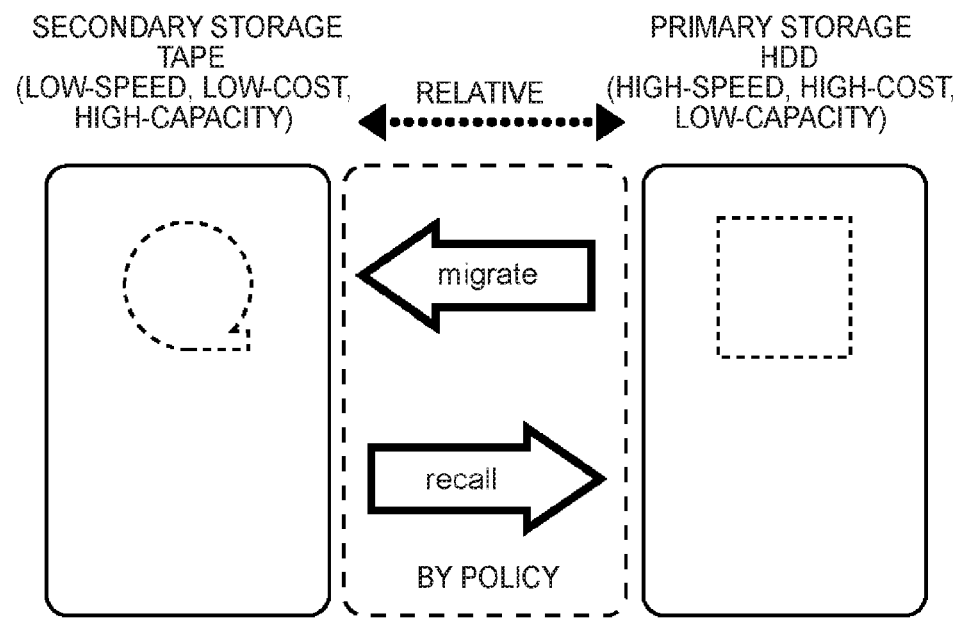
FIG. 1 is a diagram showing operations in a hierarchical storage (hereinafter, HSM)

FIG. 1 and FIG. 2 depict an environment wherein the present invention may be deployed. Specifically, FIG. 1 is a diagram showing operations in a hierarchical storage memory (hereinafter, HSM). In the hierarchical storage memory, frequently-accessed data is stored in a (relatively) high-speed, high-cost, low-capacity disk (HDD) or the like, and other data is stored in a (relatively) low-speed, low-cost, high-capacity tape or the like so that data can be stored in the most suitable storage device depending on the "access frequency."

In this exemplary setting, two kinds of storage devices are configured so that the disk (HDD) will be used as a primary storage device and the tape will be used as a secondary storage device. Usually, the selection of these storage devices is automatically made by a policy preset by a user. A "policy" is a rule that defines what data is stored in which storage device. For example, a rule that "a file that has not been accessed for the last 90 days is moved to a tape" corresponds to the policy.

In the HSM, the movement of data between the HDD and the tape is performed transparently from the perspective of the user. The following description will be made by using the disk as a (relatively) high-speed storage device and the tape as a (relatively) low-speed storage device.

In the HSM, the following two or more kinds of operations are generally available:

migrate: To move data from a disk to a tape.
recall: To move data from a tape to a disk.

FIG. 2 is a schematic diagram showing the states of files in the HSM. With the above operations, files in the HSM generally have any of the following states (A), (B), and (C), respectively. Schematically in FIG. 2, a state where a file exists is indicated by the heavy line and a state where no file exists is indicated by the broken line.

(A) resident: State where data of a file is only on a disk.
(B) migrated: State where data of a file is only on a tape.
(C) premigrated: State where data of a file is both on the disk and the tape.

The state (C) is generally a state when premigration processing has been performed before migration that leaves data both on the disk and the tape, or a state of a file immediately after being recalled. In general, since data on the tape is not deleted immediately after a recall is performed, the data is temporarily present on both the disk and the tape.

Figure 3:
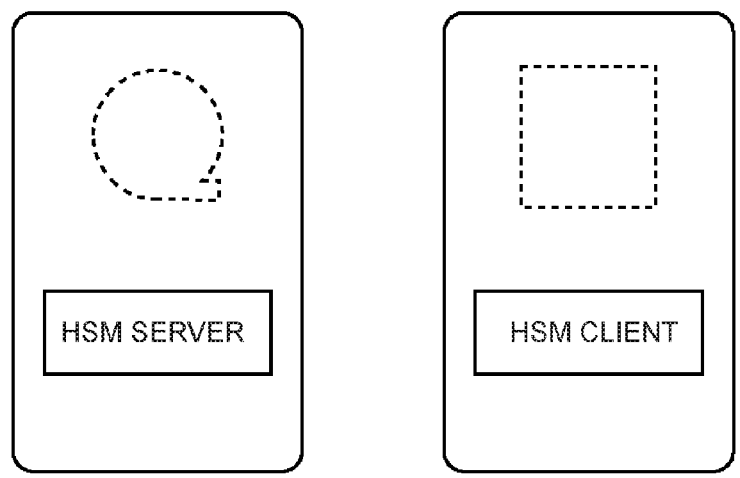
FIG. 3 is a schematic diagram showing an implementation of a server-client model in the HSM.

FIG. 3 is a schematic diagram showing an implementation of a server-client model in the HSM. In the HSM, a main body performing operations is often implemented as a server-client model as schematically shown here.

HSM client: A machine connected to a primary storage such as a disk (HDD) and a program running on the machine.

HSM server: A machine connected to a secondary storage such as a tape and a program running on the machine.

The HSM client receives access to a file or the like, or monitors access to make a request to the HSM server for migrate/recall according to the policy. The HSM server writes data sent from the HSM client to a tape, and sends data read from the tape to the HSM client. The user side is usually unaware of migrate/recall. As software for implementing the HSM, for example, there is IBM (trademark of IBM Corporation) TSM HSM.

Asynchronous Copy

On the other hand, there is an application called "asynchronous copy" for copying data from an operating site to a backup site in a storage system asynchronously with I/O from a host. Usually, in the asynchronous copy, it is common practice to perform such an incremental copy that, in a copy process at a certain time point, only files changed after the time of the previous copy are transferred. IBM SONAS is an example of a storage system that has an asynchronous copy function. (Note: the term(s) "IBM" and/or "SONAS" may be subject to trademark rights in various jurisdictions throughout the world and are used here only in reference to the products or services properly denominated by the marks to the extent that such trademark rights may exist.)

Asynchronous Copy on HSM

The asynchronous copy and the HSM are usually implemented and operated independently of each other, and it is not uncommon to perform an asynchronous copy in a storage system for performing operational management in the HSM. In fact, for example, the IBM SONAS supports both the HSM and the asynchronous copy. In such a system, the asynchronous copy does not usually know whether a file is migrated or not.

Therefore, when a migrated file is to be copied, the asynchronous copy tries to read the file, and as a result, the HSM recalls the file. In the asynchronous copy, there is a need to read the content of the file and send the read content of the file to a backup site. Thus, in the asynchronous copy, when the file is a migrated file, a recall operation cannot be avoided.

However, considering the purpose of the hierarchical storage, it is not expected to increase the access frequency of the file that asynchronous copy reads, such as to increase the probability of being accessed in the future, because the file recalled by the asynchronous copy is different from a file recalled by the user. Therefore, it is desired to migrate the file again as soon as possible after the asynchronous copy completes the read data of the file. This is particularly important when the capacity of a disk as the primary storage is relatively small.

As a method of migrating a file recalled by the asynchronous copy as soon as possible after completion of the copy, a method of using the fact that the file is in a premigrated state is considered. In general, a recalled file gets into the premigrated state immediately after that. Even when the asynchronous copy has performed the recall, this state occurs. Therefore, if it is set in an HSM policy that "a file in the premigrated state is migrated," it will be considered to be migrated timely after the execution of the synchronous copy. However, in such a technique, files premigrated by access from applications other than the asynchronous copy are also handled in the same way. This causes a disadvantageous problem when these (premigrated) files are not desired to be migrated preferentially, and there has been such a case as a practical matter.

Various patent references describe the migration of data and the control of hierarchical storage. However, each of these references only disclose fragmented approaches.

In hierarchical storage, a file recalled by a specific application is migrated as soon as possible after completion of the application process. Specifically, the effective UID of a specific process is preregistered on an HSM client. After a recall operation is performed on a certain file from the user ID, when there is no access from the UID to the file for a given length of time, the file is migrated. Files premigrated by access from any application other than an asynchronous copy are not handled in the same way, and this resolves a disadvantageous problem caused when these (premigrated) files are not desired to be migrated preferentially.

In one embodiment of the present invention, there is provided a method of re-migrating a recalled file as early a time as possible by newly managing and using the following constituent elements:

User ID that has generated a recall

Elapsed time since the recall

Timeout table composed of pairs of the user IDs mentioned above and timeout values The details of respective constituent elements and a novel method using these constituent elements will be described later. The present invention can be carried out basically by making a change only to an HSM client. In most cases, the present invention can be applied without changing existing applications themselves. In the following, a general flow of the method of the present invention will first be described, and then the details of the method will be described while taking examples.

General Flow of Method of Present Invention

Figure 4:
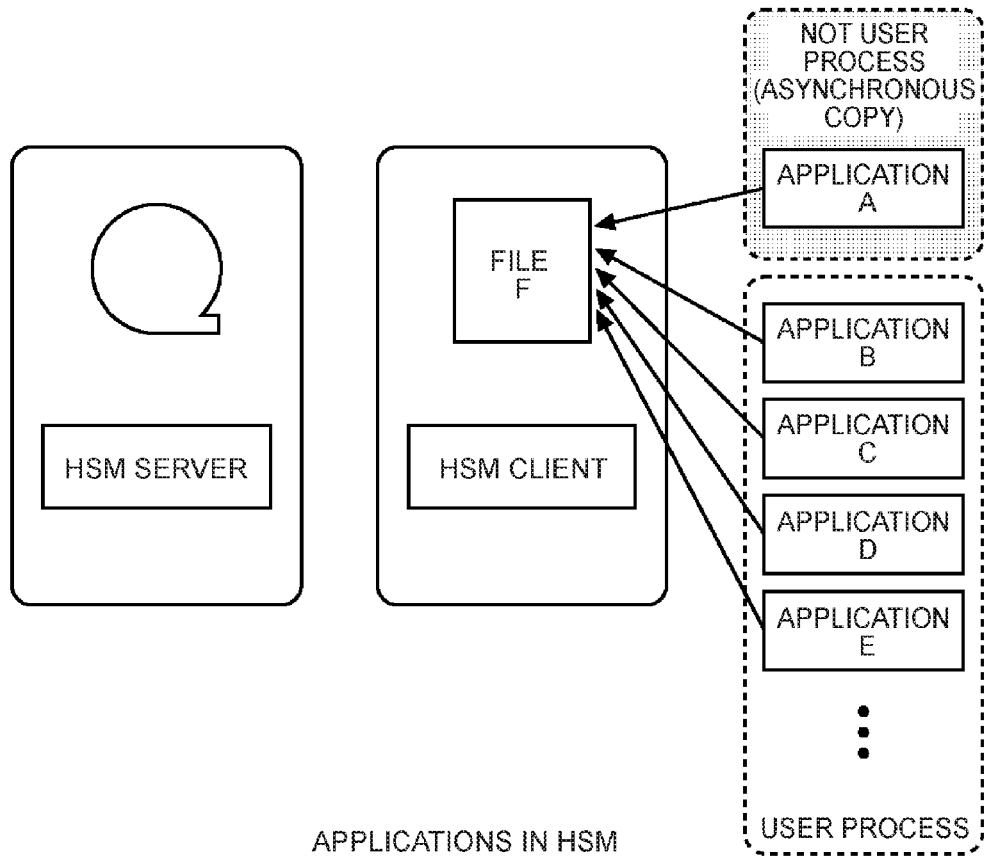
FIG. 4 is a schematic diagram showing the access status of applications in the HSM.

Here, a general flow of the method will be described. FIG. 4 is a schematic diagram showing the access status of applications in the HSM. A situation where a certain application A is running on a system in which the HSM is configured is assumed. The application A accesses migrated file F. Access to this file F involves a recall, and F gets into a pre-migrated or resident state. In order to re-migrate F as soon as possible after the access to F by A is ended, the method operates as follows:

1. An effective user ID U that runs the application A and timeout T are preregistered.

2. A timer is started at the time of access to F by U. This timer is reset each time F is accessed by U.

3. The timer is deleted at the time of access to F by one other than U.

4. When the value of the timer exceeds T, F is migrated and the timer is deleted.

Detailed Description of the Method

Here, the details of the method will be described. The description will be made while showing an example of operation when the application is an asynchronous copy for illustrative purposes, but the present invention is applicable regardless of the application.

1. Preparation

The following steps are executed only once before use of the application is started:

1-1. Creation of Dedicated User

A dedicated user is created by any method according to the OS of a target system. The UID of this dedicated user is set as u.

1-2. Registration of User and Timeout Value

On an HSM client on a machine that executes the asynchronous copy, u and timeout value t are paired and registered in a timeout table. The timeout value t is the "maximum interval of continuous I/O instructions executed until processing for a certain file is completed in the asynchronous copy." This value t depends on the application, the machine executing the application, and the environment.

For example, suppose that a 1 GB file is to be asynchronously copied. In this case, this file is read on a machine as its source and transferred to a destination through a network using a protocol such as ssh. Under normal conditions, the file is read in smaller units (e.g., 512 KB) and buffered, and when some amount of data (e.g., 16 MB) are accumulated in the buffer, the data is transferred through the network. In other words, when the reading unit is 512 KB, a read system call is called 2048 times to read data of 1 GB. In this case, t is set to a time enough to be the calling interval of each of these read system calls. Conversely, t is so set that processing for this file will be considered to be completed unless the reading of this file from the application takes t seconds or more.

For example, when a specific value of t is determined, the following can be considered: When the bandwidth of an execution environment, such as the CPU, the disk, the network, etc. is sufficient, and if file data is simply read and transferred all at once through the network, the interval of each read will be supposed to be sufficiently small (one second or less). Therefore, a value of 900 seconds (=15 minutes) can be set as t (with a sufficient margin).

Unlike the above case, when data is compressed after the file data is read and the compressed data is transferred through the network, the reading interval is expected to be longer than that in the above case. In such a case, it may be set to t=1800 seconds to give a further margin. Here, the value of t is considered to be about 15 minutes. On the other hand, when migration is performed by a policy without applying the method, a very long period is usually set as a threshold value, such as "to migrate a file that has not been accessed for 60 days or more since the file was last accessed."

From a comparison between 15 minutes and 60 days, it is found that migration by the method is performed at very early timing. Although an adequate value of t depends on the environment, suitable t can be determined by actually executing the application while monitoring the I/O status of files. When the present invention is applied to two or more applications, a timeout value is registered for each of UIDs different from application to application.

FIG. 5 is a diagram showing a registration example when the present invention is applied to two or more applications. Here, a timeout table is used as an example. Here, the effective UID of an asynchronous copy is set to 10, and the UID of another application using the present invention is set to 20.

1-3. Change to Asynchronous Copy Program

To apply the present invention, the effective user ID must be u in a part for performing I/O processing of data during an asynchronous copy. The method for realizing this varies in processing depending on the system. For example, in Linux (trademark of Linus Torvalds), it is only necessary to perform an asynchronous copy from a process whose effective user ID is u. Further, a seteuid system call can be used as needed.

2. When Asynchronous Copy Starts Access to Certain Migrated File F

The following processing is performed on migrated file F only once when the asynchronous copy starts access to the file F. Here, a case where the file F is present at its source is considered for illustrative purposes, but the present invention is also applicable to a case where the file F is present at its destination. If f is in a resident/premigrated state, the asynchronous copy can read data on the disk as-is without going through the HSM client. In such a case, the present invention is never applied to the file f.

When f is in a migrated state, if the asynchronous copy tries to read data of f, the HSM client will request the HSM server for recall processing. In this case, the HSM client checks on the UID of a process that tries to read f, and determines whether the UID is listed in the timeout table.

FIG. 6 is a diagram showing an example of operation in which a certain application accesses file f. The operation has the following 1 to 3:

1. The asynchronous copy (UID=10) tries to read file F on a storage.
2. Since f is migrated, the HSM client requests a recall of F from the HSM server.
3. Entity data of file f on a tape or the like are saved into file F on the storage (or loaded in a memory).

Here, when the effective UID of a process accessing file F is present in the timeout table, the following processing is performed on the HSM client before requesting the recall from the HSM server:

2-1. Start of Access Timer

When Recall processing for file f occurs, 0 is internally set in an access timer for file f to start the timer. The timer is reset to 0 each time F is accessed from u (to be described later). In other words, the timer represents the "elapsed time since the asynchronous copy last accessed file F."

2-2. Hooking Read/Write by DMAPI

A hook function hook is called at the time of file access (metadata, data IO) to file f. This function hook is deleted at timing where it is considered that the "asynchronous copy has terminated the access to file f" (to be described later). This function hook can be registered by using, for example, DMAPI (Data Management API) standardized in SNIA. The DMAPI is supported in XFS, JFS, GPFS (trademark of IBM Corporation), and the like, and can also be used in SONAS.

A method used when a target file system does not support the DMAPI will be described later. In this function hook, the following processing is performed:

When the UID of a process that accesses f is u, the timer is reset to 0.

When the UID of the process that accesses f is other than u, the timer and the hook function are deleted.

The latter means a case, for example, where a user process other than the asynchronous copy has accessed file f. In this case, whether to migrate f follows an existing policy, rather than the present invention. Therefore, before an application with UID=u completes processing for f, if another application unlisted in the timeout table accesses f, f will not be migrated according to a conventional HSM policy on the assumption that there is further access to f in the future.

Figure 7:
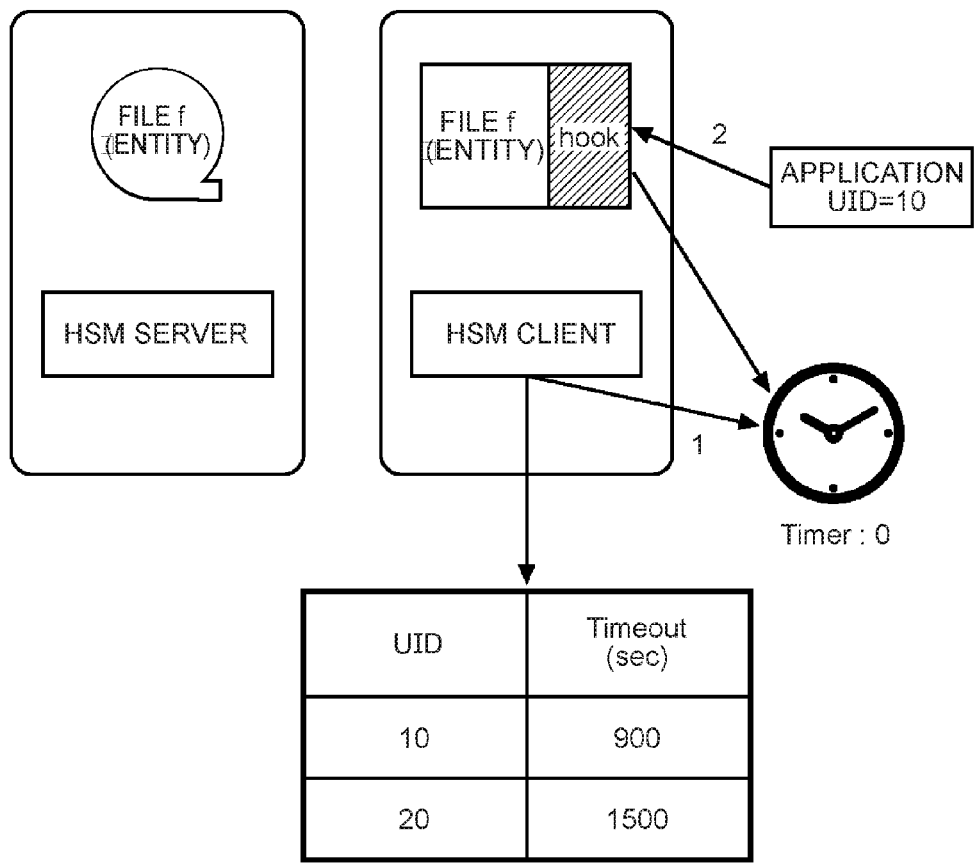
FIG. 7 is a diagram showing an example of operation in which, when a certain application accesses file F, a timer is operated on the HSM client.

FIG. 7 is a diagram showing an example of operation in which, when a certain application accesses file f, a timer is operated on the HSM client. The diagrammatic representation of 2-1 and 2-2 mentioned above are as shown in FIG. 7.

1. The HSM client starts a "timer for file F with UID=10."
2. A "hook function hook for file f" is set by using DMAPI. This function is called each time f is accessed.

3. From when Asynchronous Copy Starts Processing Using File F Until Processing is Completed When the recall is completed in step 2, the asynchronous copy process starts reading file f. During reading f, the HSM client performs the following:

3-1. Detection of Timeout of Timer

When a timeout of the timer for f is detected, the asynchronous copy considers that the processing for f is completed, and deletes the function hook and migrates f by a timeout routine. Note that, when there are two or more timers related to f (i.e., when the present invention is applied to two or more applications), the function hook is not deleted so that f will be migrated only when all the timers are timed out.

When Target File System does not Implement DMAPI

When a target file system does not implement the DMAPI, the present invention can be realized by performing the following processing:

In 2-1, atime when the timer is kicked is memorized.
In 3-1, the atime of fat the time is acquired and compared with the memorized atime.

When the atime is updated, the timer is reset. In this method, however, even when another process accesses f while the asynchronous copy is processing f, f is migrated after the lapse of a predetermined time. In the present invention, the asynchronous copy is taken as an example of an application for illustrative purposes, but the technical ideas of the present invention can be applied regardless of the application.

Further, the description is made by referring to the disk as primary storage and the tape as secondary storage, but those skilled in the art can apply the present invention to various storage devices regardless of the kinds of storage devices.

What is claimed is:

1. A system comprising:
a processor; and
a memory in communication with the processor, the memory containing program instructions that, when executed by the processor, are configured to cause the processor to perform a method, the method comprising:
receiving access to a file (F) from an application, the file (F) being stored in primary storage or secondary storage, wherein the application is distinguished by a user ID (UID);
determining whether the access corresponds to an asynchronous copy operation;
setting a timeout (T) responsive to determining that the access corresponds to an asynchronous copy operation, wherein the timeout (T) is set for each user ID (UID);
recalling the file (F) from secondary storage to primary storage; and
migrating the file (F) from primary storage to secondary storage after the set timeout (T) has passed.

2. A system comprising:
a processor; and
a memory in communication with the processor, the memory containing program instructions that, when executed by the processor, are configured to cause the processor to perform a method, the method comprising:
monitoring access to a file (F) from an application, the file (F) being stored in primary storage or secondary storage, wherein the application is distinguished by a user ID (UID);
determining whether the access is from a specific application; and
responsive to determining that the access is from a specific application, recalling the file (F) from secondary storage to primary storage, and after a set predetermined time has passed, migrating the file (F) from primary storage to secondary storage to handle the access in a manner different from access from any application other than the specific application, wherein the predetermined time is set for each user ID (UID).

3. The system of claim 2, wherein the specific application is an application involving access as an asynchronous copy.

4. The system of claim 2, wherein the specific application initiates an asynchronous copy operation.

* * * * *